W. MOSLEY.
STUFFING BOX.
APPLICATION FILED JULY 2, 1909.

988,730.

Patented Apr. 4, 1911.

UNITED STATES PATENT OFFICE.

WILLIAM MOSLEY, OF ST. PAUL, MINNESOTA.

STUFFING-BOX.

988,730.     Specification of Letters Patent.     Patented Apr. 4, 1911.

Application filed July 2, 1909. Serial No. 505,691.

*To all whom it may concern:*

Be it known that I, WILLIAM MOSLEY, a citizen of the United States, residing at St. Paul, in the county of Ramsey and State of Minnesota, have invented a new and useful Improvement in Stuffing-Boxes, of which the following is a specification.

My invention relates to improvements in stuffing boxes and has for its primary object to provide means for preventing the leakage of steam, liquid and gases around a sliding or revolving shaft under varying conditions of constant use.

It is found in practice that in cold climates the steam which escapes from leakage around piston rods and valve stems on locomotives, obstructs the view of the engineer to such an extent as to sometimes cause wrecks and loss of life. It is also found in practice that the leakage of the steam referred to results in inefficiency in operation of the engine or other mechanism with which stuffing boxes are adapted to be used. This invention overcomes these objections and further lubricates and automatically takes up the wear between the working parts of the device.

My invention may be applied to any machine employing a shaft working through the wall of a holding chamber the material out of which its parts are made being variable to overcome action from acids and other chemicals with which the parts come into contact and to allow for expansion and contraction and the action due to heat and cold.

This invention is so constructed that the wearing surfaces are automatically taken up so that an absolutely tight joint is produced and lubricant is equally distributed over all of said surfaces.

The device is simple and inexpensive in construction, effective in operation and less liable to disorder than devices of its kind heretofore in use.

In the accompanying drawings forming part of this specification Figure 1 is a longitudinal section of my invention shown applied to a cylinder and the shaft of a piston of a locomotive, detail portions of said cylinder, piston and shaft being shown; Fig. 2 is a side view of one of the conical wear rings; Fig. 3 is an end view of said wear ring; Fig. 4 is a side view of one of the auxiliary wear rings; Fig. 5 is a side view of one of the follower rings; Fig. 6 is an end view of Fig. 5; Fig. 7 is a side view of a section of the lubricator; Fig. 8 is an end view of Fig. 7; Fig. 9 is a side view of another section of the lubricator; Fig. 10 is a side view of one of the packing rings used on the lubricator and Fig. 11 is an end view of Fig. 10.

In the accompanying drawings A represents the stuffing box frame on the end of a cylinder B.

C represents a reciprocating shaft passing centrally through the opening 2 in the end of the cylinder and through the stuffing box and connected to the piston 3 in said cylinder. Upon the outer end of the stuffing box is the usual gland D which is secured to the frame in the usual manner by means of the bolts 4, gasket rings 5 being placed between the gland and the frame to produce a tight joint. Within the stuffing box frame is a chamber E in which the parts of my invention are adapted to be placed for the purpose of producing a tight joint around the shaft and preventing steam from escaping when the shaft is in motion.

6 and 7 are two wear rings which are similar in construction each being split at 8 to embrace the shaft closely. Each wear ring is conical on its outer surface and the two rings are placed on the shaft in the chamber E with their tapering ends pointing away from each other. Between the bases 9 of the wear rings is a pair of auxiliary wear rings 10 and 11 and a lubricator F the former being placed within the latter. Upon each main wear ring is a follower ring 12 the inner surface of which tapers to coincide with the conical surface of the main wear ring upon which it is mounted. The outer surface of each follower ring is formed with a shoulder 13 and between the shoulder 13 of each follower ring and the end wall of the chamber E adjacent thereto, is placed an expansion helical spring 14 which tends to mount upon the inner conical wear ring and close it tightly upon its shaft as the latter wears away.

The lubricator F is made in two parts 16 and 17. The part 16 is in the form of a ring fitting loosely into the chamber E around the shaft and having an annular channel 19, and a perforated collar 18. The section 17 is also in the form of an annular ring of substantially the same diameter as the diameter of the section 16 and is also provided with the annular channel 20. In the channels 19 and 20 are placed pairs of packing rings 21 which serve to form tight joints between the lubricator and the inner wall of the chamber E. The section 17 is adapted to be placed adjoining the perforated portion of the section 16 between the main wear rings in the chamber E. The inner surface of the section 16 is formed with an annular shoulder 22 projecting inwardly which is adapted to hold the auxiliary wear rings 10 and 11 separated within the lubricator. The auxiliary wear rings are similar in construction each being split at 23. They rest normally within the lubricator and are expanded a little larger than the diameter of the shaft. Each auxiliary wear ring has a tapering outer surface 24 near one end and as the main wear rings wear, the auxiliary wear rings advance until their surfaces 24 impinge upon the inner surfaces of the followers whereupon the auxiliary wear rings contract and in a measure take the place of the main wear rings until the latter are replaced by new ones. The wall of the stuffing box frame is formed with an opening 25 which registers with that portion of the lubricator connecting with the perforations 18 in the collar of the section 16. A lubricating cup G is secured to the stuffing box and connected with the opening 25 and is adapted by its plunger 26 in the usual manner to inject lubricant in any form such as oil or graphite into the stuffing box under substantially greater pressure than that of the steam between the parts of the stuffing box. The pressure of the lubricant within the lubricator F tends to separate the auxiliary wear rings and it is this force that causes them to advance and take the place of the main wear rings as the latter are worn away. The inner ends of the follower rings 12 are held impinged upon the ends of the lubricator by the springs 14. The springs 14 being of substantially equal strength hold the parts in the stuffing box poised upon the shaft and the lubricant being injected under pressure is adapted to be distributed between the wear rings and the shaft thus forming a tight and serviceable joint. The wear rings may be made out of Babbitt metal or any suitable material and all of the parts may be made of any material desired according to the uses to which my invention is applicable.

It will be obvious that this device may be applied to valve stems and other devices where packing of this general type is employed also that it is applicable to a rotary shaft to produce a tight working joint. This device may be used upon ammonia machines effectively. By using two sets of spring packing rings and followers and applying the lubricant between the sets, a joint is produced which is positive in action and adapted to take up the wear of the parts.

In accordance with the patent statutes I have described the principles of operation of my invention together with apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. In a device of the class set forth, a stuffing box having a lubricating opening in its wall between its ends, a shaft passing through said box, main wear rings on said shaft having conical outer surfaces tapering inwardly and apart, followers on said rings, springs impinging against the ends of said box and followers, a lubricator registering with said opening and placed between the inner ends of said rings and auxiliary wear rings in said lubricator adapted to be forced longitudinally by the lubricant after said main wear rings and to be compressed on said shaft by impinging against said inner tapering surface of the followers as the main wear rings are worn away.

2. In a device of the class set forth, a stuffing box having a lubricating opening in its wall between its ends, a shaft passing through said box, main wear rings on said shaft having conical outer surfaces tapering inwardly away from each other, followers on said rings, springs impinging against the ends of said box and followers, auxiliary wear rings between the pairs of main wear rings and followers, and a lubricator around said auxiliary rings and between the pairs of wear rings and followers comprising a pair of circular members, a packing ring between the outer surface of said members and inner surface of said box, one of said members being perforated to conduct the lubricant from the opening in the frame of the stuffing box to between the auxiliary wear rings, whereby said auxiliary wear rings are forced apart and adapted to move longitudinally and follow after the main wear rings as the latter are worn away.

In testimony whereof, I have signed my name to this specification, in the presence of two subscribing witnesses.

WILLIAM MOSLEY.

Witnesses:
JULE DONOVAN,
F. G. BRADBURY.

---

Copies of this patent may be obtained for five cents each, by addressing the "Commissioner of Patents, Washington, D. C."